(12) United States Patent
Yoakum et al.

(10) Patent No.: US 8,789,209 B2
(45) Date of Patent: Jul. 22, 2014

(54) ENTERPRISE LICENSE REGISTRAR ANCHOR POINT

(75) Inventors: John H. Yoakum, Cary, NC (US); William T. Walker, Evergreen, CO (US)

(73) Assignee: Avaya Inc., Basking Ridge, NJ (US)

( * ) Notice: Subject to any disclaimer, the term of this patent is extended or adjusted under 35 U.S.C. 154(b) by 104 days.

(21) Appl. No.: 13/414,293

(22) Filed: Mar. 7, 2012

(65) Prior Publication Data

US 2013/0239232 A1  Sep. 12, 2013

(51) Int. Cl.
*H04L 29/06* (2006.01)

(52) U.S. Cl.
USPC .......................................................... 726/29

(58) Field of Classification Search
USPC .......................................................... 726/29
See application file for complete search history.

(56) References Cited

U.S. PATENT DOCUMENTS

| | | | |
|---|---|---|---|
| 5,758,069 A | 5/1998 | Olsen | |
| 6,785,885 B2 | 8/2004 | Norris et al. | |
| 7,127,442 B2 | 10/2006 | Mazza et al. | |
| 7,216,363 B2 | 5/2007 | Serkowski et al. | |
| 7,228,567 B2 | 6/2007 | Serkowski et al. | |
| 7,260,557 B2 | 8/2007 | Chavez | |
| 7,272,500 B1 | 9/2007 | Walker | |
| 7,373,657 B2 | 5/2008 | Walker | |
| 7,698,225 B2 | 4/2010 | Rhodes et al. | |
| 7,707,116 B2 | 4/2010 | Walker et al. | |
| 7,747,851 B1 * | 6/2010 | Robinson et al. | 713/156 |
| 7,788,181 B2 * | 8/2010 | Ben-Menahem et al. | 705/59 |
| 7,854,011 B2 | 12/2010 | Chen et al. | |
| 7,865,444 B1 | 1/2011 | Biswas et al. | |
| 7,890,997 B2 | 2/2011 | Walker et al. | |
| 7,966,520 B2 | 6/2011 | Walker et al. | |
| 2002/0136405 A1 | 9/2002 | Hori | |
| 2004/0044631 A1 | 3/2004 | Walker et al. | |
| 2004/0172367 A1 | 9/2004 | Chavez | |
| 2006/0179058 A1 * | 8/2006 | Bram et al. | 707/9 |
| 2006/0242083 A1 | 10/2006 | Chavez | |
| 2007/0094710 A1 | 4/2007 | Walker et al. | |
| 2008/0052295 A1 | 2/2008 | Walker et al. | |

(Continued)

FOREIGN PATENT DOCUMENTS

| | | |
|---|---|---|
| EP | 0538464 | 4/1993 |
| EP | 2216732 | 8/2010 |

OTHER PUBLICATIONS

Extended Search Report for European Patent Application No. 12185499.6, dated Jun. 5, 2013, 7 pages.

(Continued)

*Primary Examiner* — Joseph P. Hirl
*Assistant Examiner* — John B King
(74) *Attorney, Agent, or Firm* — Sheridan Ross P.C.

(57) ABSTRACT

Methods and systems for providing an enterprise license registrar anchor point are provided. More particularly, an enterprise license registrar is established within an enterprise system using license files and a certificate provided by an external license authority. The enterprise license registrar operates within the enterprise system to maintain a record of allocations of license rights by license manager servers to application instances. The enterprise license registrar logs the report data. The log files are digitally signed or encrypted to prevent tampering by the enterprise system, and are delivered to the external license authority, without requiring a persistent connection between the external license authority and the enterprise system. The enterprise system can comprise a virtualized environment.

20 Claims, 3 Drawing Sheets

(56) References Cited

U.S. PATENT DOCUMENTS

| | | |
|---|---|---|
| 2008/0189131 A1 | 8/2008 | Chavez |
| 2010/0049725 A1 | 2/2010 | Walker et al. |
| 2010/0161981 A1* | 6/2010 | Dodgson et al. ............. 713/168 |
| 2011/0047624 A1 | 2/2011 | Vedantam et al. |
| 2011/0072522 A1 | 3/2011 | Koka et al. |
| 2012/0096455 A1* | 4/2012 | Katsumata et al. ........... 717/177 |
| 2012/0174090 A1 | 7/2012 | Carollo et al. |
| 2012/0246086 A1 | 9/2012 | Mazza et al. |
| 2013/0104240 A1 | 4/2013 | Walker et al. |

OTHER PUBLICATIONS

IBM, "License Use Management", available at http://www-01.ibm.com/software/awdtools/lum/about.html, IBM, available 2009.

Schmidt et al., U.S. Appl. No. 13/151,042, Entitled "Method and Apparatus for Assigning and Releasing Licenses", filed Jun. 1, 2011, 36 pages.

Citrix, "Licensing Basics", available at http://www.citrix.com/lang/english/lp/lp_2305120.asp, Citrix Systems, Inc., available Nov. 2010.

* cited by examiner

ENTERPRISE LICENSE REGISTRAR ANCHOR POINT

FIELD

This invention relates to the licensing of software. More particularly, this invention relates to the licensing of systems in a virtualized environment.

BACKGROUND

Enterprise systems may comprise multiple instances of application software. Such applications may be individually licensed to users within the enterprise on demand. In order to enforce licensing schemes, the allocation of licenses in response to requests to access licensed resources can be controlled by license servers. Specifically, a license server can allocate a required license in response to a valid request, so long as such license certificates remain available. If a requested license is not available, the license server can deny access to the associated resource.

In order to prevent the cloning of license servers and their associated license certificates, requests for such certificates can be required to be associated with a valid media access control (MAC) address or other tie to physical hardware. However, because such an approach is hardware centric, it is ineffective when the license server is in a virtual environment. In order to support the allocation of licenses in a virtual environment, a persistent connection between an external license authority and the licensed system can be maintained. In such a system, real time or near real time information regarding the number and types of license certificates that have been allocated for use within a system is provided to the license authority. However, such systems cannot be used if a persistent connection to the licensed system is unavailable. For example, secrecy or privacy concerns may result in a refusal by the system operator to allow access to their network by an external authority. As a result, it can be difficult or even impossible for licensors to verify that software licenses are not being replicated, either accidentally or intentionally, by the system operator.

As alternatives to maintaining a persistent external connection in order to enforce licensing schemes, license rights can be tied to particular hardware characteristics, such as a processor identifier in addition or as an alternative to a network interface MAC address. Such approaches can allow customers to move between different license servers, but they require that the customer return to the license authority to perform a license re-host transaction to update the license file to reflect the MAC address of the new server. However, such approaches are inapplicable to virtualized environments. Other schemes require shipping unique physical software copies, such as individual CDs, that have embedded identifiers and inflexible licensing mechanisms to end users. However, such schemes are also ineffective in virtualized environments.

SUMMARY

Embodiments of the present disclosure are directed to solving these and other problems and disadvantages of the prior art. In particular, a licensing solution is provided that can be deployed in connection with virtualized environments, and that does not require a persistent connection between the system comprising the virtualized environment, hereinafter referred to as the enterprise or enterprise system, and an external license authority or registrar. More particularly, an enterprise license registrar that is hosted by the enterprise system comprising the virtualized environment is provided. The enterprise license registrar (ELR) receives an enterprise license registrar (ELR) certificate from the external license authority. The ELR certificate includes an ELR ID. In addition, the external license authority provides a license manager server a license file containing a record of the licenses that have been purchased or otherwise obtained from the license authority by the enterprise that identifies the recipient license manager server, and that includes an identification of the ELR that is operative for those licenses. More particularly, each license file has a unique ID and version number. The ELR certificate and the license file are associated with the enterprise license registrar or authority by the unique enterprise license registrar identifier (ID) that is assigned by the license authority. After receiving the ELR certificate, the enterprise license registrar can interact with a license manager server provided as part of the enterprise system, which acts as an interface between application instances running in the enterprise environment and the enterprise license registrar. The license manager server accesses the ELR with a specified ELR ID and requests permission to use the license file with the specified license file ID. The ELR allows the license manager server to use the license file if no other license manager server is currently registered with the given license file ID. Alternatively, the ELR can temporarily allow the license manager server to use the license file even if the given license file ID is already registered in connection with another license manager server. Moreover, a record of the multiple registrations is maintained and reported for billing purposes to the external license authority, for example during normal reporting procedures. The ELR logs all registration requests by license manager servers, including those that are allowed and those that are denied.

More particularly, the license manager server operates to allocate license rights to application instances, in order to enable operability of those application instances or subsets of those applications, such as but not limited to a feature or other part of an application or an add-on to an application. This can be performed by allowing or prohibiting the operation of or access to licensed resources. The allocation or denials made by the license manager server can be reported to the enterprise license registrar, which can maintain a record or log of the license allocations made by the license manager server.

The file or files maintained by the ELR can be updated whenever a new request is received from a license manager server. The contents of the log can be delivered to the external license authority periodically, without requiring that the external license authority have access to the enterprise system through a persistent connection or even at the initiative of the external license authority. Instead, the log files can be sent without requiring any real time interactivity between the external license authority and the ELR. For example, the log files, and also the ELR certificate and license files, can be exchanged as data files attached to emails, or stored in removable storage media.

In accordance with embodiments of the present disclosure, the license manager server allocates individual licenses or license rights in response to requests from application instances or devices running within the enterprise that are associated with or that desire access to or use of licensed resources, hereinafter referred to as application instances. As used herein, licensed resources can include applications, application instances, features, access to data, or any other resource subject to a license from a license authority or resource provider. Absent the grant of an associated license, access to or use of a licensed resource is denied. Periodically, the license manager server communicates with the enterprise license registrar to determine or verify the license rights that the license manager server can allocate to application instances, to enable operation of those application instances, and/or features associated with application instances. The communications between the license manager server and the enterprise license registrar can include the provision of a license registration request that includes a report of license registrar events handled by the license manager server. As an example, the license manager server can communicate with the enterprise license registrar at set intervals, such as hourly or daily. As a further example, the license manager server can communicate with the enterprise license server on any license certificate installation, modification, or deletion event. Accordingly, communications between the license manager server and the enterprise license registrar can be at a relatively low rate, resulting in reduced traffic as compared to alternative systems in which a persistent connection between the license manager server and the enterprise license registrar is maintained.

The enterprise license registrar maintains a log of the license registrar events received in the reports from the different license manager servers. Examples of information that can be maintained in the log include the number of registration requests, license file IDs or license rights that have been allocated, registration denials, and the like. The logged information can reveal registration grants that are in excess of the rights obtained by the enterprise, for example where a temporary over-allocation of such rights is allowed to ensure availability of resources by the enterprise (e.g. when a license manager server is moved in a virtualized environment it may be necessary to bring up the new license manager server instance before the previous instance is retired).

In accordance with embodiments of the present disclosure, information contained in the log files is digitally signed and associated with the license registrar ID. Accordingly, the log files cannot be manipulated by the licensed enterprise. The log files can be communicated to the external license registrar periodically. For example, the log information can be made available by granting the external license authority limited access to the enterprise system (i.e., access to such log files only) on a periodic basis. Alternatively or in addition, log information can be delivered to the external license authority at the initiative of the licensed enterprise. Log information can be delivered to the external license registrar by email, through delivery of physical storage media, such as a hard disk drive, solid state memory device, or through on site review by the license authority. Alternatively, log files can be delivered to the external license registrar only when formally requested by the external license registrar rather than periodically.

The above implementations may also be implemented as a non-transitory computer readable medium having stored thereon computer executable instructions; the computer executable instructions are executed by a processor. Additional features and advantages of embodiments of the present disclosure will become more readily apparent from the following description, particularly when taken together with the accompanying drawings.

DETAILED DESCRIPTION

Figure 1:
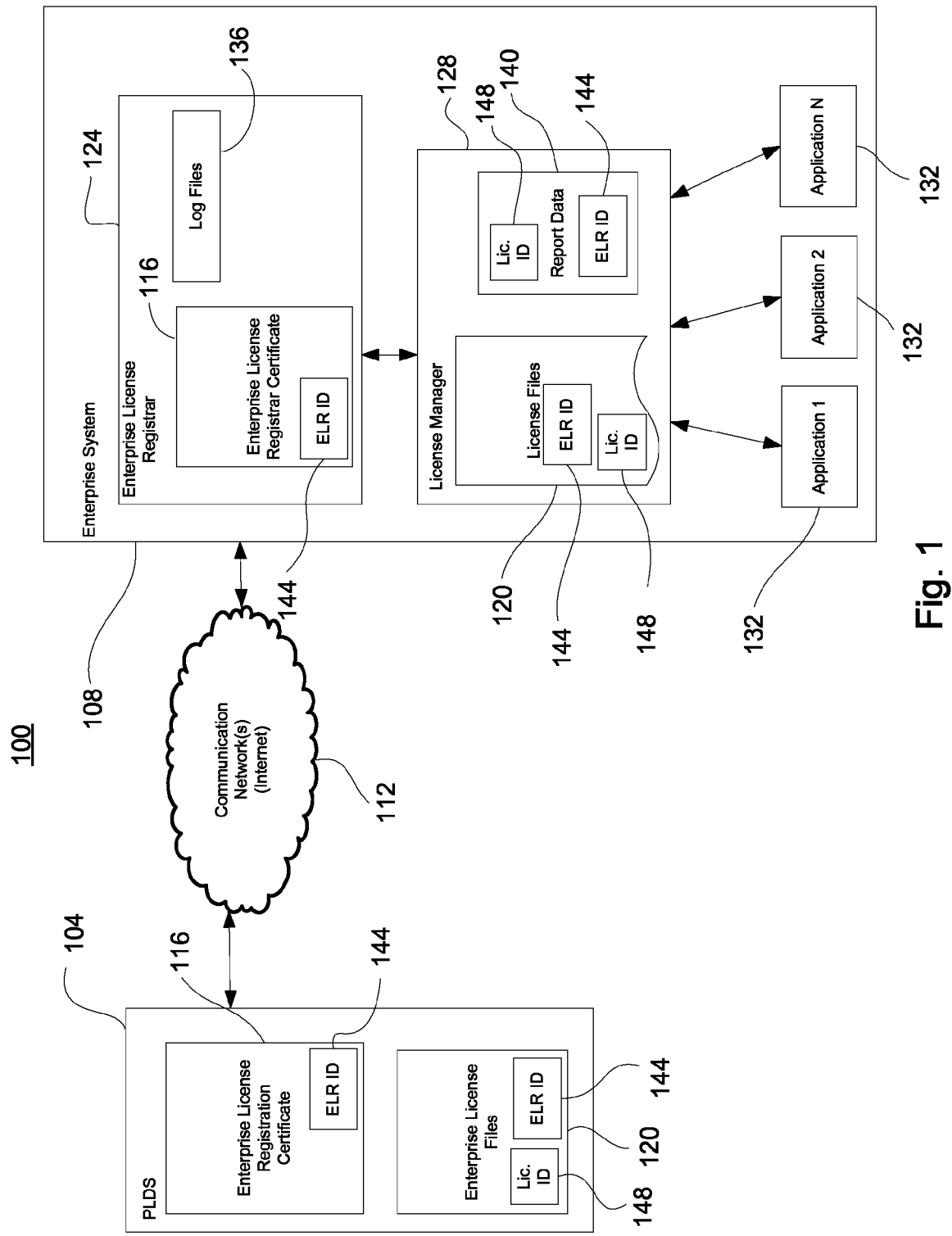
FIG. 1 depicts components of a system in accordance with embodiments of the present disclosure.

FIG. 1 illustrates an exemplary licensing system 100 in accordance with embodiments of the present disclosure. In general, the licensing system 100 includes a product licensing and delivery system (PLDS) 104 and an enterprise system 108. In the example system 100, the PLDS 104 is shown as being interconnected to the enterprise system 108 by a communication network 112, such as the Internet. However, as will become apparent from the description provided herein, a network connection between the PLDS 104 and the enterprise system 108 is not required.

The PLDS 104 may comprise an external license authority or registrar, that operates to license application instances running on or established in connection with the enterprise system 108. More particularly, the PLDS 104 can operate to provide an enterprise license registrar (ELR) certificate 116 and license files 120 to the enterprise system 108. As can be appreciated by one of skill in the art after consideration of the present disclosure, the provision of an ELR certificate 116 and license files 120 can be made under the terms of a license agreement between the external license authority implementing the PLDS 104, and the enterprise operating or associated with the enterprise system 108.

The enterprise system 108 generally includes an enterprise license registrar (ELR) 124, a license manager server 128, and one or more licensed applications or application instances 132. The ELR 124 may comprise a server or other computer device, including a virtual device, that is hosted on a device provided as part of the enterprise system 108. Moreover, the ELR 124 may comprise application programming provided by the external license authority for implementing various of the license operations described herein. The ELR 124 can operate as a repository for the ELR certificate 116 provided to the ELR 124 by the PLDS 104. In addition, the ELR 124 can maintain log files 136 related to the distribution of licenses and/or the use of licensed resources within the enterprise system 108.

The license manager server 128 is configured to point to the ELR 124 within the enterprise system 108 in connection with reporting the use or allocation of license files 120 provided by the PLDS 104. The license files 120 provided to a license manager server 128 can include all or a subset of the license files 120 available to the enterprise system 108, and are associated with a license manager server 128 license file identifier 148. Where the enterprise system 108 includes multiple license manager servers 128 that each point to the same ELR 124, each license manager server 128 is provided with a license file 120 that includes a license file ID 148 to identify the recipient license manager server 128. The license manager server installs the license files 120 provided by the PLDS 104, and can then operate to distribute license rights (i.e., to enable access to licensed resources) in response to requests from application instances 132. In accordance with embodiments of the present disclosure, the license manager server 128 is allowed to enable access to licensed resources by application instances 132 in excess of the license rights represented by installed license files 120 under limited circumstances. For example, allocations of license rights in excess of those represented by the held license certificates 120 can be made for limited time periods. Such functionality allows the external license authority to permit the enterprise system 108 to continue desired operations, without interruption, enhancing customer satisfaction. Allocations made by the license manager server 128 to application instances 132 from held license rights as established by the license file or files 120 available to the license manager server 128, or through allocations of license rights to application instances 132 in excess of those set forth in the license files 120, for example under grace provisions, are recorded. This and other information, such as the date, time and duration of license allocations, is recorded by the license manager server 128 is stored by the license manager server 128 as report data 140. This report data 140 is then communicated to the enterprise license registrar 124, together with an identification of the license manager server 128 that generated the report, and can be included in the log files 136 maintained by the ELR 124.

In accordance with embodiments of the present disclosure, the ELR certificate 116 and license files 120 are associated with various identifying information 144. This identifying information 144 can include, for example and without limitation, the name of the ELR 124, the customer (i.e., enterprise) name, the host identifier of the enterprise system 108 server hosting the ELR 124, and/or other identifying information. Such identifying information or an appropriate subset, and license file ID information 148 uniquely identifying the license manager server 128 and/or a license version identifier, is also included in the license files 120 provided to the license manager server 128. Identifying information 144, 148 or an appropriate subset is also included in the report data 140 that is provided to the ELR 124 by the license manager server 128 for inclusion in the log files 136. In accordance with embodiments of the present disclosure, some or all of the identifying information 144 can be used to digitally sign and/or encrypt the associated certificates 116, license files 120, reports 140, and/or log files 136. Accordingly, an auditable record of the allocation of license rights to application instances 132 can be created.

Figure 2:
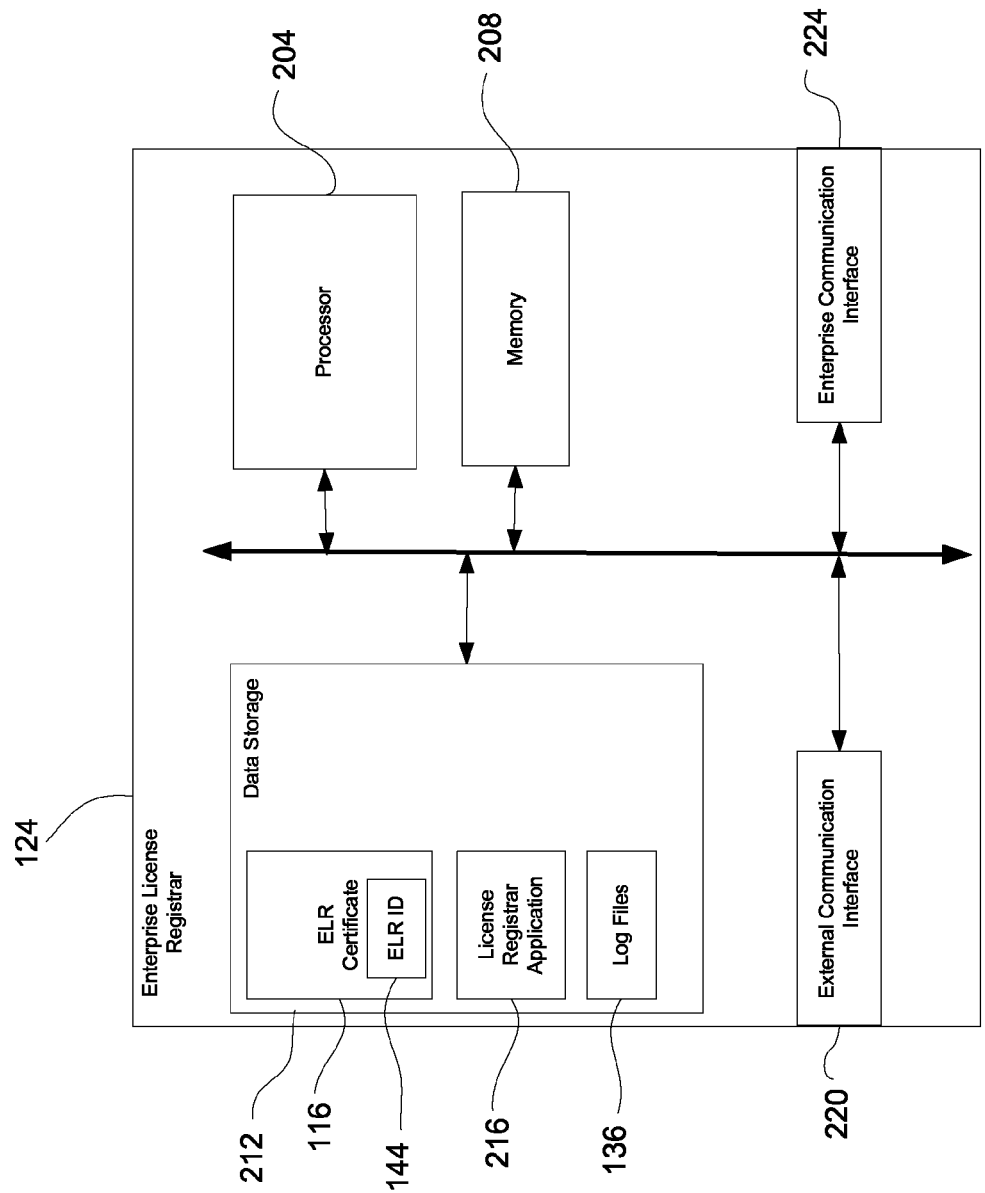
FIG. 2 depicts components of an enterprise license registrar in accordance with embodiments of the present disclosure.

FIG. 2 illustrates additional aspects of an enterprise license registrar or ELR 124 in accordance with embodiments of the present disclosure. In general, the ELR 124 includes a processor 204. The processor 204 can comprise a general purpose programmable processor or controller for executing application programming or instructions. As a further example, the processor may comprise a specially configured application specific integrated circuit (ASIC) or other integrated circuit, programmable logic device or gate array, special purpose computer, or the like. The processor 204 generally functions to run programming code or instructions implementing the various functions of the ELR 124.

The ELR 124 may additionally include memory 208 for use in connection with the execution of application programming by the processor 204, and for the temporary or long term storage of program instructions and/or data. As examples, the memory 208 may comprise RAM, SDRAM, or other solid state memory. Alternatively or in addition, data storage 212 may be provided. In accordance with embodiments of the disclosed invention, data storage 212 can contain programming code or instructions implementing various of the applications, functions or modules executed or provided by the ELR 124. In addition, as described herein, the memory 208 and/or data storage 212 associated with the ELR 124 can include various files and/or records, such as an ELR certificate 116 and log files 136. Examples of application programming can include a license registrar application 216 that is operable to provide license handling and logging procedures as described herein.

In addition, the ELR 124 can include an external communication interface and/or input/output port 220 and an enterprise communication interface and/or input/output port 224.

In general, the external communication interface 220 can be used to support the receipt of files and information from the PLDS 104. Examples of such files and information include ELR certificates 116, enterprise license files 120 and the license registrar application 216. The external communication interface 220 can also support the provision of files and data to the PLDS 104. Examples of such files and data include log files 136 providing information regarding license allocations made within the enterprise system 108. In accordance with embodiments of the present disclosure, the external communication interface 220 is not required to support or provide a persistent communication channel between the ELR 124 and the PLDS 104. Instead, such communications can be made whenever new files or data are available, and/or on a scheduled or intermittent basis. Moreover, communications between the PLDS 104 and the ELR 124 can require the explicit permission of the enterprise system 108. Accordingly, the enterprise system 108 can enforce restrictions on access to the enterprise system 108 by external systems, such as the PLDS 104. Communications between the PLDS 104 and the ELR 124 can be made using a communication network 112 to which the external communication interface 220 is interconnected. Accordingly, the external communication interface 220 can comprise a network interface. Alternatively or in addition, the external communication interface 220 can comprise a data storage device capable of reading from and writing to removable storage media, in which case the removable storage media can be used to transfer files and data between the PLDS 104 and the ELR 124.

The enterprise communication interface 224 can operate to connect the ELR 124 to other components or nodes of the enterprise system 108. Accordingly, the enterprise communication interface 224 can comprise a network interface that connects the ELR 124 to an internal enterprise system 108 network, and in turn to enterprise system 108 nodes, including but not limited to one or more license manager servers 128. The enterprise communication interface 224 can be associated with an address, such as an Internet protocol address, that allows a license manager server 128 to initiate communications with the ELR 124, and to request license files 120 from, or provide report data 140 to the ELR 124. As can be appreciated by one of skill in the art after consideration of the present disclosure, the external communication interface 220 and the enterprise communication interface 224 may be implemented using a common hardware device or devices. Moreover, various alternate arrangements for receiving and sending data with respect to the ELR 124 are possible. For instance, the enterprise communication interface 224 can be used to communicate data between the ELR 124 and a communication or file server included in the enterprise system 108, which in turn can function to receive data from or send data to the PLDS 104.

Figure 3:
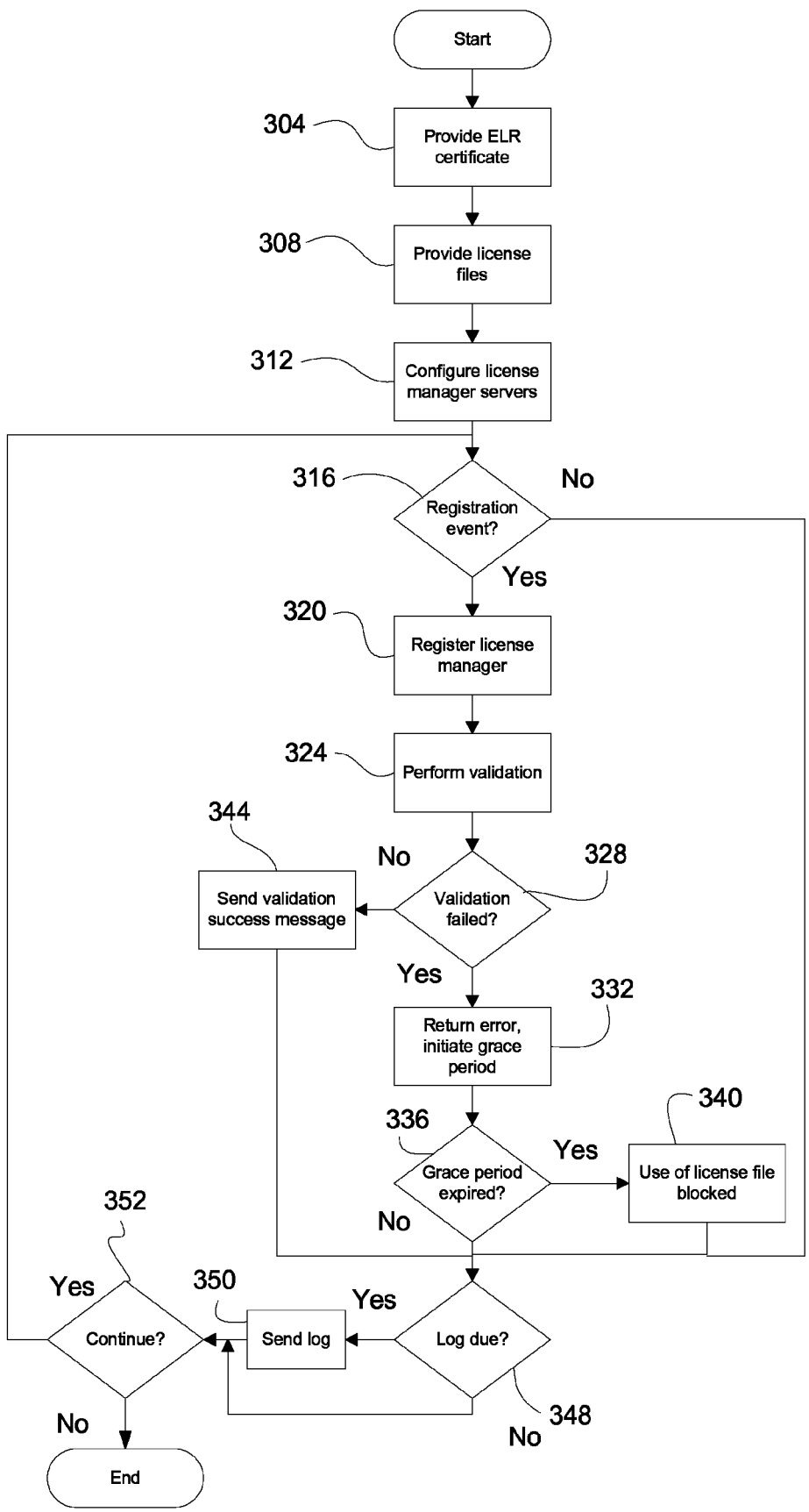
FIG. 3 is a flowchart illustrating aspects of the operation of a system in accordance with embodiments of the present disclosure.

FIG. 3 is a flowchart illustrating aspects of the operation of a system 100. More particularly, aspects of a system 100 that provides an ELR 124 hosted by an enterprise system 108 to audit and enforce license rights granted to application instances 132 within the enterprise system 108 on behalf of an external license authority are illustrated. Initially, at step 304, an ELR certificate 116 is provided by the PLDS 104 associated with the external license authority to the ELR 124 on the enterprise system 108. The ELR certificate 116 can define identifying information 144 associated with authorizing the ELR 124 to operate on behalf of the license authority, such as the ELR 124 name, customer (i.e., enterprise) name, and host identifier for the server device hosting the ELR 124. Installation of the ELR certificate 116, in combination with the ELR application 216 executed by the ELR 124, establishes the ELR 124 as a registrar recognized by the PLDS 104 of the external license authority. At step 308, license files 120 are provided to the license manager server 128 by the PLDS 104. The license files 120 can include a unique license file identification 148 of the license manager server receiving the license file 120, and a license file version identifier. The license file 120 can also include the same or different identification information 144 as was associated with the ELR certificate, such as a definition of the ELR 124, for example by the ELR name, the host identifier, allowing the ELR 124 name to be used as the host ID, in place of a MAC address, or other identifier. Moreover, the ELR 124 name or other identifier of the ELR 124 can be tied to a smart card or other secure identification mechanism to facilitate providing a name for the server or other hardware hosting the ELR 124 on the enterprise system 108. Delivery of the ELR certificate 116 and the license files 120 can be made via a communication network 112 that at least occasionally interconnects the PLDS 104 to the enterprise system 108. Alternatively or in addition, the ELR certificate 116 and/or license files 120 can be delivered through other means. For example, the ELR certificate 116 and/or license files 120 can be delivered by providing the ELR certificate 116 and/or license files 120 as data files stored on storage media, such as, but not limited to, solid state memory devices, CDs, DVDs, hard disk drives, tapes, or the like. In accordance with still other embodiments, the license files 120 can be delivered to license manager servers 128 via the ELR 124.

At step 312, each of the license manager servers 128 within the enterprise system 108 is configured with the network location of the ELR 124 serving each of those license manager servers 128. For example, the license manager server or servers 128 that will operate in connection with the ELR 124 can be provided with the IP address of the enterprise communication interface 224 for the ELR 124 after using the information 144 identifying the ELR 124 that was provided in the license file 120 to search for the address of the ELR 124. At step 316, a determination is made as to whether a license manager server 128 registration event has occurred. As used herein, a license manager server 128 registration event can be as non-limiting examples any of the following: initiated upon the start-up of a license manager server 128, the expiration of a predetermined time period since a previous license registration event for a license manager server 128, the achievement of a predetermined time and/or date for reporting, or a license file 120 installation or deletion event affecting a license manager server 128. If a license registration event has occurred, the license manager server 128 sends a license registration request to the ELR 124 (step 320). The registration request can include a report from the license manager server 128 to the ELR 124 that includes the unique license file identifier 148 of the license manager server 128, and information regarding the allocation and/or utilization of license rights by the license manager server 128 to application instances 132. Each allocation of a license right can also be associated with identifying information 144, such as enterprise system 108 name, ELR 124 name, license host name, license generation date/time, application instance 132 name, and the like. In response to receiving a license registration request, the ELR 124 performs validation functions (step 324). The validation functions can include, as non-limiting examples, determining whether the enterprise system 108 name and ELR 124 name identified in the registration report match the given information included in the ELR certificate 116 held by the ELR 124. As a further example, validation can include verifying that there are no license manager servers 128 using the same license file identifier 148. Validation can additionally include verifying that the license host name is not currently registered for the given application instance 132 with a more recent generation date and time or any other licensing pertinent information. At step 328, a determination can be made as to whether validation has failed. A check can also be made to verify that the version of the license file 120 reported by a license manager server 128 is current. If validation has failed, the ELR 124 returns an error message to the license manager server 128 (step 332). The license manager server 128 then takes appropriate enforcement action, such as blocking the registration, generating an alarm, and/or starting a grace period for licenses granted or later requested with respect to the affected license file 120. At step 336, a determination is made as to whether the grace period has expired before the registration failure is corrected. If the grace period has expired, the license manager server 128 blocks usage of the license file 120 that failed registration (step 340). If the validation passed at step 328, a validation success message is passed to the license manager server 128 (step 344).

After failing to detect a registration event at step 316, determining that a grace period has not expired, sending a validation success message at step 344, or blocking usage of a license file failing registration at step 340, a determination can be made as to whether to provide a log file 136 to the enterprise system 108 (step 348). For example, at scheduled times and/or dates a log file 136 can be delivered from the ELR 124 to the external license authority. If a log file 136 is due it is sent to the external license authority. For instance, an internal timer implemented by the license registrar application 216 running in the ELR 124 can, in response to determining that a log file 136 is due, deliver that log file 136 to the PLDS 104 over a communication network 112 as a data file, at the initiative of the ELR 124. Moreover, the trigger event for sending the log file 136 can be the expiration of a predetermined time period since the previous log file 136 was sent, a log file 136 can be sent on scheduled days and/or times, or a log file 136 can be sent in response to detecting a predefined event included in a report or other information included in a log file 136. In accordance with still other embodiments, the enterprise system 108 can send log files 136 as data files stored on removable storage media. Moreover, some or all of the steps associated with providing a log file 136 to an external authority can be performed by a human actor. After sending the log file 136, or if it was determined that a log file 136 is not due, a determination can be made as to whether operation of the system should continue (step 352). If operation is to continue, the process can return to step 316, to wait for the next registration event. If operation of the system is to be discontinued, the process may end.

Accordingly, embodiments of the disclosed invention provide for an enterprise license registrar 124 that can be hosted by an enterprise system 108, and that is separate from the PLDS 104 or other systems of a license authority or provider. The ELR 124 thus allows the enterprise system 108 to utilize licensed resources, according to rights and restrictions established in connection with licenses or license certificates 120, without requiring persistent access to the enterprise system 108 by the external license authority or requiring any on-demand direct network access to the external license authority by the applications or licenses manager. In addition, the copy protection for license files 120 is provided in a virtualized environment (i.e. where the license manager server 128 has no permanent ties to any specific hardware) without requiring a PLDS transaction to re-host the license file 120 to identify the new physical server. Accordingly, embodiments of the present disclosure facilitate the utilization of licensed resources in connection with enterprise systems 108 that prohibit or limit access to the enterprise system 108 by external systems or parties. In addition, communications between the PLDS 104 of an external license authority and the ELR 124 within an enterprise system 108 can be on an infrequent basis, and can be performed under the control of the enterprise system 108. Moreover, the nature of the communication can be limited. For example, enforcement of restrictions concerning the use of license rights can be enforced through the provision of log files 136 by the ELR 124 to the PLDS 104 on a periodic (e.g., monthly or quarterly) basis. Moreover, the log files 136 can be in the form of a data file, and do not require two-way communications in real time or near real time between the PLDS 104 and the ELR 124. The log files 136 can be encrypted, for example using information included in identifying information 144 provided by the PLDS 104 as part of an ELR certificate 116, to protect the data included in the log files 136 and to prevent tampering by the enterprise system 108. Accordingly, the log files 136 can provide an auditable record of the allocation of license rights by license manager servers 128 within an enterprise system 108. In a similar fashion, the provision of files granting licensing rights from PLDS 104 to the ELR 124 does not require two-way communications in real time or near real time between the PLDS 104 and the ELR 124

A licensing system 100 in accordance with embodiments of the present disclosure can allow an enterprise system 108 to host one or more ELRs 124. Moreover, each ELR can operate as a license registrar or authority with respect to one or more license manager servers 128. Communications between an ELR 124 and its associated license manager servers 128 can be on a periodic or non-persistent basis. In addition, an ELR 124 can be associated with physical server hardware included within an enterprise system 108. Alternatively, an ELR 124 can be implemented as a virtual server or system. In addition, the ELR 124 can block license allocations or the use of rights under a license file 120 where such use is unauthorized. More particularly, an ELR 124 can refuse a registration request made by a license manager server 128 where the registration request is in connection with an out of date license file 120, a duplicate license manager server 128 ID, or is otherwise unauthorized.

In accordance with further embodiments of the present disclosure, the system 100 can enforce use restrictions where the number of licenses available under a license file 120 have been decreased, and/or where a license manager server 128 has been decommissioned. For example, in the case of a decrease in the rights available under a license file 120, the updated rights can be included as part of an updated license file 120. The revised number of licenses can be enforced through determining at the ELR 124 that the license file 120 presented in connection with a registration request by a license manager server 128 has the latest license version identifier. In such embodiments, the ELR 124 will be provided with information setting forth the current license file version identifier. Alternatively or in addition, the latest license file version identifier reported where multiple license managers 128 report different versions for the same license file 120 can be used by the ELR 124 as the current version. In connection with the decommissioning of a license manager server 128, the license file identifier for the decommissioned license manager server 128 can be listed as invalid. This can be communicated to the ELR 124 as part of the license file 120 that receives license rights formerly held by the decommissioned license manager server 128, or where the license file 120 formerly associated with the decommissioned license manager 128 has been moved to a different license manager server 128.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method, comprising:
    establishing an enterprise license registrar in a first enterprise system, wherein the enterprise license registrar maintains a log of license allocations made within the first enterprise system;
    allocating by a first license manager server in the first enterprise system at least a first license to at least a first application instance;
    reporting by the first license manager server the allocation of the at least a first license to the first application instance to the enterprise license registrar;
    in response to receiving the report of the allocation of the at least a first license at the enterprise license registrar, including the report of the allocation of the at least a first license in the log of license allocations; and
    allocating by the first license manager server at least a second license to at least a second application instance, wherein the allocation of the at least a second license to the at least a second application instance is a licensed resource in excess of those set forth in a license certificate and wherein the allocation of the at least a second application instance is temporarily allowed to ensure availability of the excess licensed resource by the enterprise when the first license manager server is moved in a virtualized environment and a new license manager server instance is brought up before the first license server manager is retired and until the excess licensed resource can be reported to the enterprise license registrar.

2. The method of claim 1, further comprising:
    sending the log of license allocations from the enterprise license registrar to the external license authority, wherein the external license authority is external to the enterprise, wherein the log of license allocations includes the allocation of the at least a first license, and wherein the log of license allocations is associated with at least a first identifier assigned by the external license authority.

3. The method of claim 2, wherein sending the log of license allocations includes a sending the log with the first and second license allocations included in the log of license allocations.

4. The method of claim 2, further comprising:
    periodically sending the log of license allocations to the external license authority.

5. The method of claim 4, wherein the log of license allocations is sent as a data file.

6. The method of claim 5, wherein the data file is digitally signed or encrypted and is sent as at least one of an attachment to an email, or as a file stored on a removable storage medium.

7. The method of claim 1, further comprising:
reporting by the second license manager server the allocation of the at least a second license to the first application instance to the enterprise license registrar, wherein the log, in response to receiving the report of the allocation of the at least a first license at the enterprise license registrar includes the report of the allocation of the at least a first license in the log of licenses allocations.

8. The method of claim 1, further comprising:
receiving at the first license manager a plurality of requests for licenses, wherein the first request is one of the plurality of requests, and wherein the requests for licenses are received by the license manager at different times;
allocating by the first license manager a first plurality of licenses, wherein at least one license is allocated to each of a plurality of applications, wherein the first application is one of the plurality of applications, and wherein the first application is allocated the first license;
reporting by the first license manager the allocation of the first plurality of licenses to the plurality of applications in a first report sent to the enterprise license registrar;
receiving the first report of the allocation of the first plurality of licenses to the plurality of applications at the enterprise license registrar; and
storing a record of the first report of the allocation of the first plurality of licenses to the plurality of applications in the log of license allocations.

9. The method of claim 8, further comprising:
receiving at the enterprise license registrar a second report of an allocation of a second plurality of licenses, wherein the second report is received from one of the first license manager server and a second license manager server;
storing a record of the second report of the allocation of the second plurality of licenses in the log of license allocations, wherein the log of license allocations sent to the external license authority contains the record of the first report and the record of the second report.

10. A system, comprising:
an enterprise system, including:
an enterprise license registrar, including:
memory;
a processor;
an enterprise license registrar certificate stored in memory;
a license registrar application, wherein the license registrar application is operable to log reports of license file allocations in at least a first secure log file;
a first license manager server, wherein the first license manager server is periodically in communication with the enterprise license registrar, wherein the first license manager server holds a plurality of license files, wherein the first license manager server is operable to allocate license rights in response to requests and to report license allocations to the enterprise license registrar periodically, wherein the first license manager server allocates at least a second license to at least a second application instance, wherein the allocation of the at least a second license to the at least a second application instance is a licensed resource is in excess of those set forth in a license certificate and wherein the allocation of the at least a second application instance is temporarily allowed to ensure availability of the excess licensed resource by the enterprise when the first license manager server is moved in a virtualized environment and a new license manager server instance is brought up before the first license manager server is retired and until the excess licensed resource can be reported to the enterprise license registrar; and
a first plurality of application instances, wherein at least one of the first plurality of application instances is allocated a license right by the first license manager server.

11. The system of claim 10, further comprising:
an external license authority, wherein the enterprise license registrar certificate and the license files are provided to the enterprise license registrar by the external license authority.

12. The system of claim 11, wherein the enterprise license registrar certificate, the license files, and the secure log file are all associated with an enterprise license registrar identifier assigned by the external license authority.

13. The system of claim 12, further comprising:
a communication network interconnecting the external license authority and the enterprise license registrar, wherein the enterprise license registrar certificate, the license files, and the secure log file are exchanged periodically as files using the communication network.

14. The system of claim 12, further comprising:
a second license manager server, wherein the second license manager server is periodically in communication with the enterprise license registrar, wherein the second license manager server is operable to allocate license rights in response to requests and to report license allocations to the enterprise license registrar periodically.

15. The system of claim 14, wherein the enterprise license registrar is associated with a first address, and wherein the first license manager server and the second license manager server use the first address to communicate with the enterprise license registrar.

16. The system of claim 15, wherein the external license authority does not use the first address to communicate with the enterprise license registrar.

17. A non-transitory computer readable medium having stored thereon computer executable instructions, the computer executable instructions causing a processor included in an enterprise license registrar to execute a method for providing licensing services, the computer executable instructions comprising:
instructions to provide license files associated with a first enterprise license registrar identifier to one or more license manager servers;
instructions to receive reports from the one or more license manager servers related to allocations of license rights by the one or more license manager servers;
instructions to allocate at least a first license to at least a first application instance;
instructions to allocate at least a second license to at least a second application instance, wherein the allocation of the at least a second license to the at least a second application instance is a licensed resource in excess of those set forth in a license certificate and wherein the allocation of the at least a second application instance is temporarily allowed to ensure availability of the excess licensed resource by the enterprise when the one or more license manager servers is moved in a virtualized environment and a new license manager server instance is brought up before the first license server manager is retired and until the excess licensed resource can be reported to the enterprise license registrar;

instructions to compile received reports into a log file; and instructions to digitally sign the log file by applying a unique identifier associated with the first enterprise license registrar.

18. The computer readable medium of claim 17, the computer executable instructions further comprising:

instructions to send the log file to an external license authority.

19. The computer readable medium of claim 18, wherein the log file is not sent to the external license authority using a persistent connection.

20. The method of claim 1, wherein the report identifies a license file allocation that is in excess of those set forth in a license file.

* * * * *